United States Patent [19]

Endo

[11] Patent Number: 5,092,433

[45] Date of Patent: Mar. 3, 1992

[54] SWING RESISTANCE REGULATING DEVICE IN A SWING RESISTANCE DEVICE

[75] Inventor: Toshihiro Endo, Tokyo, Japan

[73] Assignee: Daiwa Corporation, Tokyo, Japan

[21] Appl. No.: 557,335

[22] Filed: Jul. 25, 1990

[30] Foreign Application Priority Data

May 23, 1990 [JP] Japan ................. 2-53007

[51] Int. Cl.$^5$ ............................. F16D 51/22
[52] U.S. Cl. ................... 188/325; 188/343; 188/290
[58] Field of Search ............... 188/78, 325, 343, 327, 188/70 R, 72.7, 72.9, 82.5, 82.74, 82.9, 335, 290, 296, 322.5, 268, 249

[56] References Cited

U.S. PATENT DOCUMENTS

| | | |
|---|---|---|
| 2,998,953 | 9/1961 | O'Connor ............ 188/268 X |
| 3,822,769 | 7/1974 | O'Connor ............ 188/290 |
| 4,083,524 | 4/1978 | O'Connor ............ 188/290 X |
| 4,736,916 | 4/1988 | Miller et al. ............ 188/290 X |

Primary Examiner—Robert J. Oberleitner
Assistant Examiner—Peter M. Poon
Attorney, Agent, or Firm—Armstrong, Nikaido, Marmelstein, Kubovcik & Murray

[57] ABSTRACT

A device for regulating swing resistance of swingable devices such as video cameras and/or motion picture cameras. A pair of right and left shoe members to be fixed to the swingable device are mounted on the body side. Elastic O rings are commonly fitted in the peripheral surfaces of the pair of shoe members and disposed such that the O rings can be contacted with and separated from the inner peripheral surface of a back plate filled with a viscous member. The contacting state of the O rings with the inner peripheral surface of the back plate is changed from a line contact to a plane contact by adjusting operation of a control member for spreading the pair of shoe members in order to steplessly regulate a swing resistance.

2 Claims, 3 Drawing Sheets

SWING RESISTANCE REGULATING DEVICE IN A SWING RESISTANCE DEVICE

BACKGROUND OF THE INVENTION

1. Field of the Invention

This invention relates to a swing resistance regulating device capable of steplessly regulating swing resistance in a swing braking device of a tripod head or panhead of a video camera, a motion picture camera or the like.

2. Brief Description of the Prior Art

Heretofore, a panhead of, for example, a video camera, is mounted on a tripod and a camera is fixed onto the panhead, so that the fixed camera can be paned and/or tilted. It is more preferable for a device for taking a motion picture such as video camera, that a camera is paned or tilted under a certain size of resistance rather than under no resistance. Therefore, it is usually equipped with a device for regulating resistance. It is also preferable for such device that the size of resistance can be freely adjusted or regulated depending on the angle of view, the weight of a camera, or personal preference of a camera man. Furthermore, this resistance must be a viscous resistance instead of a friction resistance.

The friction resistance is heavy at start and becomes light during swinging motion. It tends to become unstable during pacing operation. On the other hand, the viscous resistance is light at start and becomes heavier and the swinging speed is increased. Therefore, there can be obtained a stable swinging speed.

A conventional swing resistance regulating device, as shown in FIG. 5, is designed such that a brake mechanism 2 is disposed along the inner periphery of a cylindrical back plate 1, one ends of a pair of half-circular shoe members 3, 3 of this brake mechanism being rotatably mounted by pins 4, the other ends 5, 5 being spaced apart, a control member 6 having a tapered surface being slideably contacted therewith, the distance between the right and left shoe members 3, 3 being widened by the tapered surface. With the construction mentioned, however, the friction resistance is increased and thus undersirable. If fats and oils are applied onto the contact surface of the shoe members 3, 3 with respect to a back plate in order to reduce the friction resistance, the resistance is reduced and therefore a desired size of resistance is unobtainable. If it is pressed hard in order to increase the resistance, the oil film is cut and a point contact is taken place, thus becoming a friction resistance.

SUMMARY OF THE INVENTION

The object of the present invention is to provide a swing resistance regulating device which is capable of steplessly regulating the size of resistance while maintaining the property of viscous resistance.

To achieve the above object, a swing resistance regulating device in a swing resistance device according to the present invention comprises a body to be fixed to a panhead of a camera, etc., a center shaft reciprocally movably mounted to said body, a back plate mounted on said center shaft thrusted therethrough, a pair of half-circular shoe members disposed in such a manner as to be opposite to each other to form a circular configuration within said back plate, a support member integral with said body, one end of each of said half-circular shoe members being rotatably mounted on said support member, an elastic O ring fitted into a groove formed on the periphery of each of said half-circular shoe members in the circumferential direction thereof, the external periphery of said O ring being placed opposite to the inner peripheral surface of said back plate such that said O ring can be contacted with and separated from the inner periphery of said back plate, a viscous member being filled in a space formed between said back plate and the external periphery of each of said half-circular shoe members with said O ring fitted thereto, and a control member mounted on said center shaft thrusted therethrough and adapted to adjust the distance between said pair of half-circular shoe members.

BRIEF DESCRIPTION OF THE DRAWINGS

The drawings illustrate the embodiment of a swing resistance regulating device in a swing resister device according to the present invention, wherein.

DETAILED DESCRIPTION OF THE PREFERRED EMBODIMENT

Figure 1:
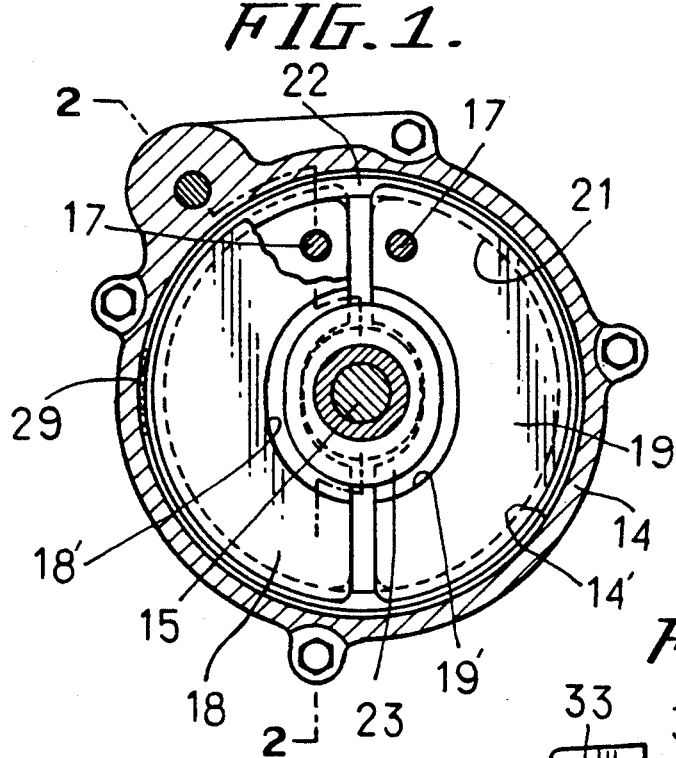
FIG. 1 is a sectional view.
Figure 3:
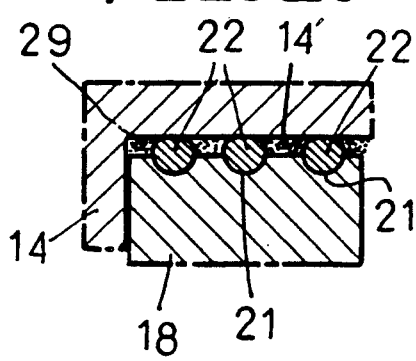
FIG. 3 is an enlarged view of a part of FIG. 2.

One preferred embodiment of a swing resistance regulating device in a swing resister device of the present invention will now be described with reference to FIGS. 1 through 3. The device of this embodiment is mounted on a side surface of a panhead 50 of a camera so that it is operated to brake a vertical swinging motion. However, in order to brake a horizontal swinging motion, the device should be mounted on the lower surface of the panhead.

Figure 2:
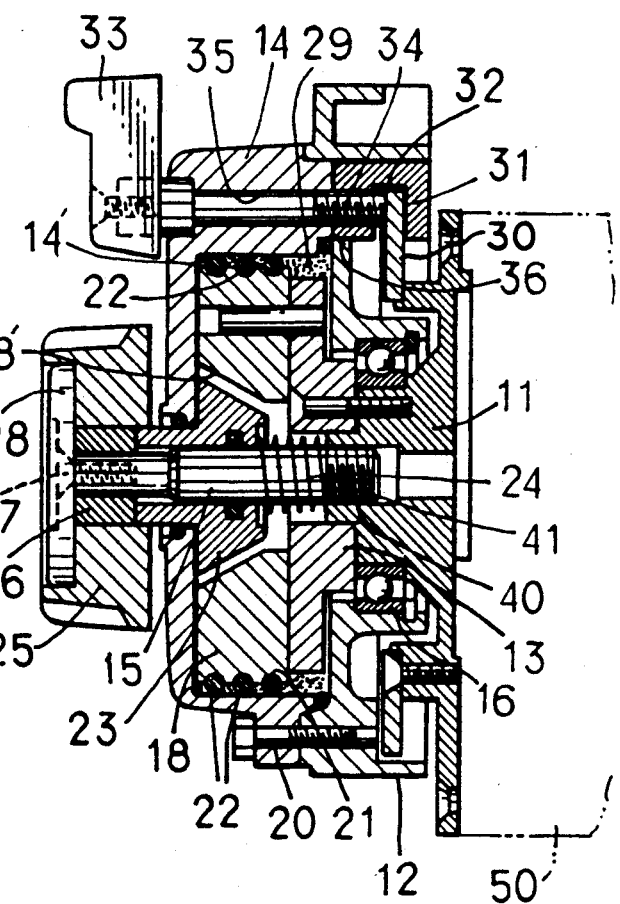
FIG. 2 is a vertical sectional view taken on line 2—2 of FIG. 1.
Figure 4:
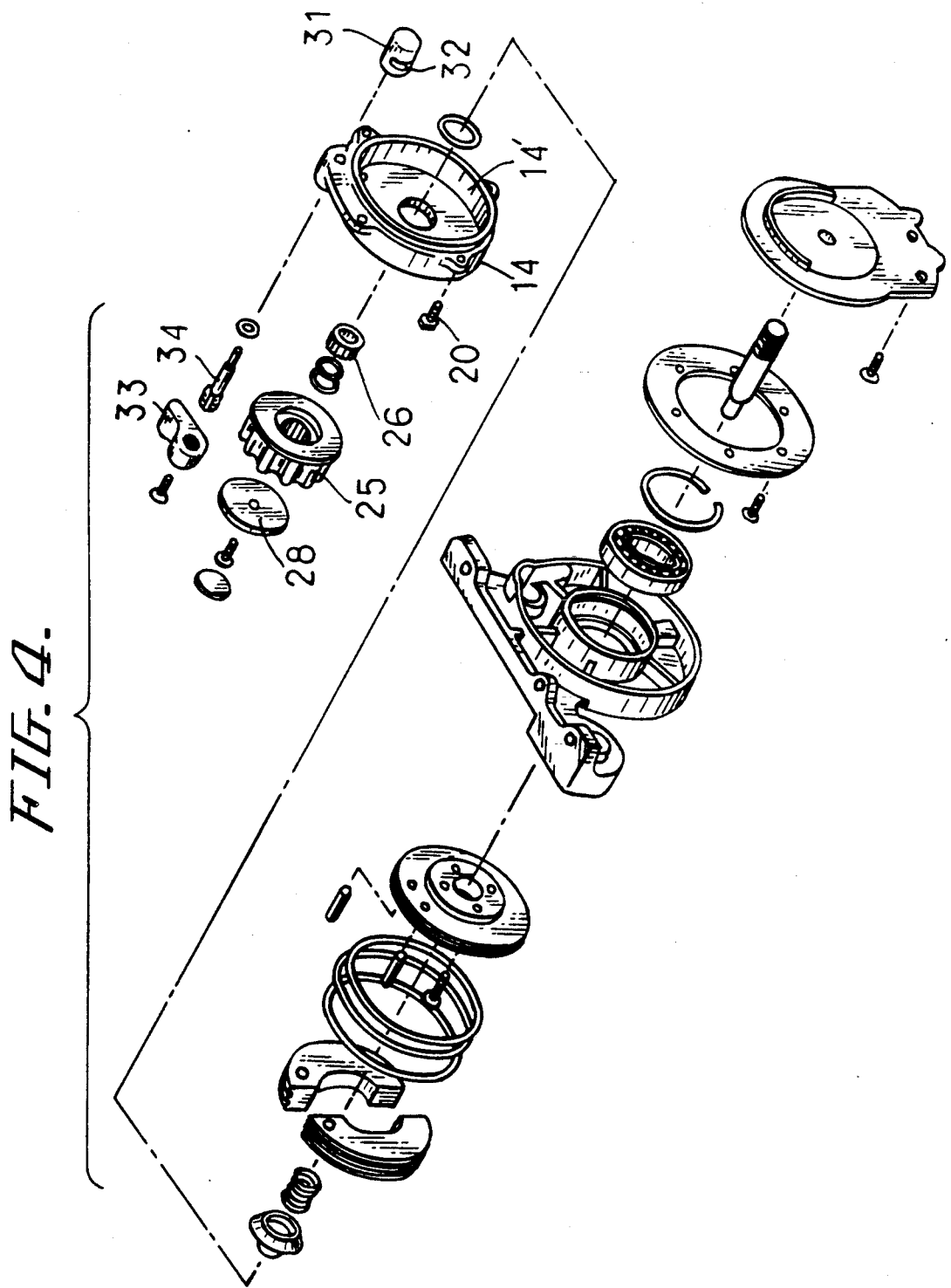
FIG. 4 is an exploded perspective view.
Figure 5:
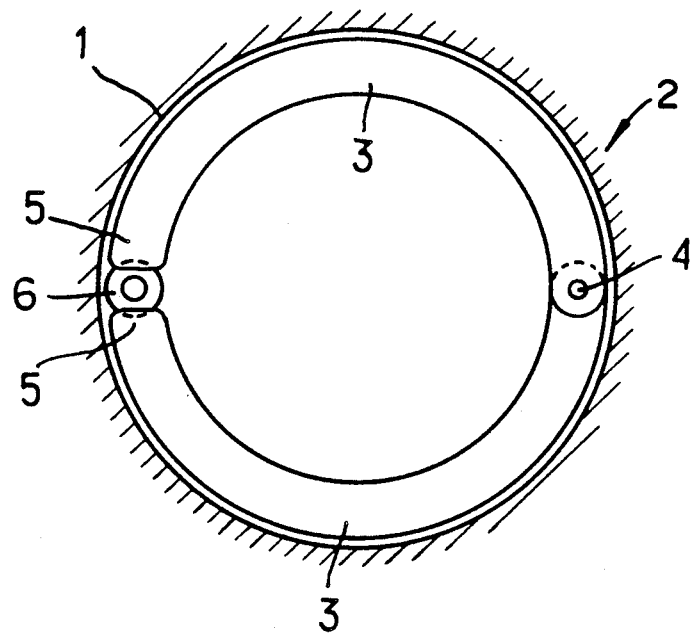
FIG. 5 is a front view of the conventional swing resistance regulating device in a swing resister device.

In FIG. 2, the numeral 11 denotes a body of a swing resistance device which is to be fixed to a panhead of a camera or the like. A center shaft 15 is provided on its periphery with a male screw 41 which is threaded into a female screw hole 40 formed in the body 11. And the center shaft 15 is allowed to thrust into the center holes of a side plate 12, a support plate 13 and a back plate 14, while the side plate 12 is rotatably supported on the body 11 through a ball bearing 16. A pair of right and left half-circular shoe members 18 and 19 are pivotally attached to a support member 13 by pins 17. A case-like back plate 14 is fixed to the side plate by pins 20. Three linear grooves 21 are formed on the periphery of each of the pair of half circular shoe members 18 and 19, respectively. Common elastic O rings 22 are fitted into the grooves 21 of the right and left shoe members 18 and 19, and the external peripheries of the O rings are contacted with the inner periphery 14' of the back plate 14.

The center shaft 15 is provided with a control member 23 mounted thereon and adapted to enlarge and shorten the distance between the shoe members 18 and 19. The center shaft 15 has a coil spring 24 wound thereon. The coil spring 24 wound on the center shaft 15 is contacted with the control member 23, and the control member 23 is received by a release 26 of an adjusting handle 25 mounted on one end of the center shaft 15. The release 26 is received by a presser member 28 secured to one end of the center shaft 15 by means of a machine screw 27. And a highly viscous grease-like viscous member 29 is filled in a space defined by the inner peripheral surface of the back plate 14 and the pair of half-circular shoe members 18 and 19 with the O rings fitted thereto.

The control member 23 has a cone shape and is contacted with the inner surfaces 18' and 19' of the pair of half-circular right and left shoe members 18 and 19 having a generally same configuration. The center shaft 15 is progressed by the male screw 41 thereof according to the rotating operation of the adjusting handle 25. The release 26 integral with the adjusting handle 25 pushes the elliptical cone shaped control member 23 against the coil spring 24. As a result, the shoe members 18 and 19 are spaced apart rightwardly and leftwardly and as a result, the O rings 22 are spread to change their contacting degree with the inner periphery 14' of the back plate 14.

The present invention is not intended for braking but for regulating the swing resistance in a wide range. Accordingly, in this embodiment, a lock (brake) mechanism is separately provided. That is, a lock disk 30 is fixed to the body 11 and a lock brake 31 is disposed such that the disk-shaped outer periphery of the lock disk 30 enters into a groove 32 of the lock brake 31. On the other hand, a male screw portion of a lock screw 34 which is secured to a lock lever 33 is threaded into a female screw portion of the lock brake 31 via a hole 35 of the back plate 14 and a hole 36 of the side plate 12. When the lock screw 34 is rotated in the tightening direction of the male screw portion, the lock disk 30 is sandwiched between a forward end of the lock screw 34 and the lock brake 31 to provide a firmly locked state.

The shoe members 18, 19 and the back plate 14 are not directly slide contacted with each other. Instead, a viscous resistance acts among the viscous member 29 filled in the space, the O rings 22 covered on their surfaces with the viscous members 29 and the back plate 14. Therefore, when the center shaft 15 is progressed by rotating the handle 25, the release 26 is also progressed together with the center shaft 15 to push the control member 23. As the control member 23 is formed in a conical shape, the distance between the shoe members 18 and 19 are enlarged. As a result, the O rings 22 are spread by the shoe members 18 and 19 and contacted with the inner surface 14' of the back plate 14 under pressure. As a result, a contacting state of the O rings 22 with respect to the back plate 14 is changed from a line contact to a plane contact. As a result, the viscous resistance is increased.

According to the present invention, when the distance between the pair of shoe members 18 and 19 is enlarged, a contact area of the elastic O rings 22 with respect to the back plate 14 is generally proportionally increased, force per unit area is not increased, generation of a friction resistance can be avoided, and a steplessly regulating range of the viscous resistance due to increase or decrease of the contact area can be enlarged. Furthermore, as the elastic O rings 22 are interposed between the shoe members 18, 19 and the back plate 14, a high degree of circular concentricity between the shoe members 18, 19 and is the back plate 14 are not required. Therefore, the shoe members can be manufactured at low cost.

What is claimed is:

1. A swing resistance regulating device in a swing resistance device comprises:
   a body to be fixed to a panhead of a camera;
   a center shaft reciprocally movably mounted to said body;
   a back plate rotatably mounted on said body with said center shaft thrusted through said back plate;
   a pair of half-circular shoe members disposed in such a manner as to be opposite to each other to form a circular configuration within said back plate;
   a support member integral with said body, one end of each of said half-circular shoe members being rotatably mounted on said support member;
   an elastic O ring fitted into a groove formed on the periphery of each of said half-circular shoe members in the circumferential direction thereof, the external periphery of said O ring being placed opposite to the inner peripheral surface of said back plate such that said O ring can be contacted with and separated from the inner periphery of said back plate;
   a viscous member being filled in a space formed between said back plate and the external periphery of each of said half-circular shoe members with said O ring fitted thereto; and
   a control member mounted on said center shaft with said center shaft thrusted therethrough and adapted to adjust the distance between said pair of half-circular shoe members.

2. A swing resistance regulating device in a swing resistance device as claimed in claim 1, which further includes means for directly braking said body by causing a lock brake adapted to press and fix the outer surface of a lock disk fixed to said body to be threadedly engaged with a lock screw thrusted in said back plate.

* * * * *